United States Patent [19]

Ignagni

[11] Patent Number: 5,048,963
[45] Date of Patent: Sep. 17, 1991

[54] DITHER SIGNAL REMOVER FOR A DITHERED RING LASER GYRO

[75] Inventor: Mario B. Ignagni, Arden Hills, Minn.
[73] Assignee: Honeywell Inc., Minneapolis, Minn.
[21] Appl. No.: 430,215
[22] Filed: Nov. 1, 1989
[51] Int. Cl.$^5$ ............................................. G01C 19/64
[52] U.S. Cl. ................................................... 356/350
[58] Field of Search ......................................... 356/350

[56] References Cited

U.S. PATENT DOCUMENTS

4,695,160 9/1987 Egli .................................... 356/350
4,802,766 2/1989 Lundeen et al. ...................... 356/350

Primary Examiner—Samuel Turner
Attorney, Agent, or Firm—Robert A. Pajak

[57] ABSTRACT

In a dithered ring laser gyro, a dither reference signal is provided to supply information representative of the dither angle or dither angular rate. This information is processed by a signal processor to generate a correction signal which is the sum of (i) a first function of the dither reference signal indicative of the dither angle multiplied by a first coefficient, and (ii) a second function of the dither reference signal indicative of the dither angular rate multiplied by a second coefficient. The aforementioned coefficient may be either selected or generated based on historical data derived from the dither reference signal and the usual sensor output signal. In turn, the correction signal is subtracted from the usual ring laser gyro output signal to provide a corrected sensor output signal.

7 Claims, 3 Drawing Sheets

DITHER SIGNAL REMOVER FOR A DITHERED RING LASER GYRO

FIELD OF THE INVENTION

This invention relates to ring laser gyros in which a dithering bias is used to minimize the effects of lock-in inherent in such sensors. More particularly, this invention relates to a mechanization for removing the dither signal from the sensor rotation output signal.

BACKGROUND OF THE INVENTION

The behavior of ring laser angular rate sensors, usually referred to as ring laser gyros, is well understood. Inherent in such sensors is the phenomena known as lock-in in which counter-propagating laser beams tend to lock together to a common frequency. The lock-in phenomena causes performance errors which have deleterious effects in navigational systems.

To avoid or reduce the effects of lock-in, the ring laser gyro may be biased by an alternating bias technique such as that shown and described in U.S. Pat. No. 3,373,650 issued in the name of J. E. Killpatrick. The alternating bias technique is usually referred to as dithering, and may be implemented by a variety of ways including electro-optical and mechanical schemes. Since dithering, by either of these mentioned techniques and the like, directly affects the behavior of the counter-propagating laser beams, the sensor readout signal will contain not only inertial rate information, but will also contain a signal component directly related to the dithering (alternating bias) of the sensor.

In situations where the gyro is mounted to an inertial platform or mounting base, and mechanical dithering is applied, the gyro output will consist of the sum of the base angular motion and the the gyro dither motion relative to the mounting base. This is true whether the sensor readout is mounted directly on the sensor (laser block mounted) or fixed relative to the sensor mounting base (case mounted) like that shown in the aforementioned patent.

The signal contribution in the sensor readout signal due to the alternating bias is herein referred to as the dither signal component. For low noise navigational systems, the dither signal component in the readout signal generally needs to be minimized or removed to avoid control problems, particularly in block mounted readout systems.

Prior art solutions to remove the dither signal component include, among others, notch filters. However, such notch filters generate gain and phase shift disturbances which can affect the stability of any control loops or any readout signal processing systems. Another solution utilizes a digital pulse subtraction technique as taught in U.S. Pat. No. 4,248,534, issued to Elbert.

A desirable solution is to remove the dither signal component by generating a correction signal which is substantially equivalent to the dither signal component. This latter approach is taught in U.S. Pat. No. 4,344,706 issued to Ljung et al. Ljung et al. teaches the use of a tracking circuit for tracking the clockwise and counter-clockwise components of dither rotation. These dither components are subtracted from the usual readout signal which is responsive to the counter-propagating laser beams of the sensor thereby providing a corrected readout signal.

Another technique is to strip the dither signal component by an electronic dither compensator as taught in U.S. Pat. No. 4,610,543 issued to Ferriss. This patent illustrates an up/down count technique for a ring laser gyro readout mechanization in which readout output counts due to dither are subtracted from the readout output count in order to provide a corrected readout count.

The Ferriss patent also shows a closed-loop feedback method of reducing the dither component in the system readout signal. In Ferriss, a dither correction signal is subtracted from the gyro readout signal to derive a corrected sensor output signal. Closed loop correction is provided by generating the dither correction signal as a function of a dither reference signal representative of the dithering or alternating bias, and the relationship between the correction signal and the dither reference signal is controlled as a function of any dither signal component in the corrected sensor output signal.

BRIEF DESCRIPTION OF THE INVENTION

It is an object of the present invention to provide a dither signal compensator for a ring laser gyro which strips any dither signal component in the usual ring laser gyro readout to provide a corrected gyro output.

It is an object of the present invention to provide a dither signal compensator which may be implemented by digital signal processing techniques.

In the preferred embodiment of a dithered ring laser gyro in accordance with the present invention, a dither reference signal is provided to supply information representative of the dither angle or dither angular rate. This information is process by a signal processor to generate a correction signal which is the sum of (i) a first function of the dither reference signal indicative of the the dither angle multiplied by a first coefficient, and (ii) a second function of the dither reference signal indicative of the the dither angular rate multiplied by a second coefficient. The aforementioned coefficient may be either selected or generated based on historical data derived from the dither reference signal and the usual sensor output signal. In turn, the correction signal is subtracted from the usual ring laser gyro output signal to provide a corrected sensor output signal.

DETAILED DESCRIPTION OF THE INVENTION

Figure 1:
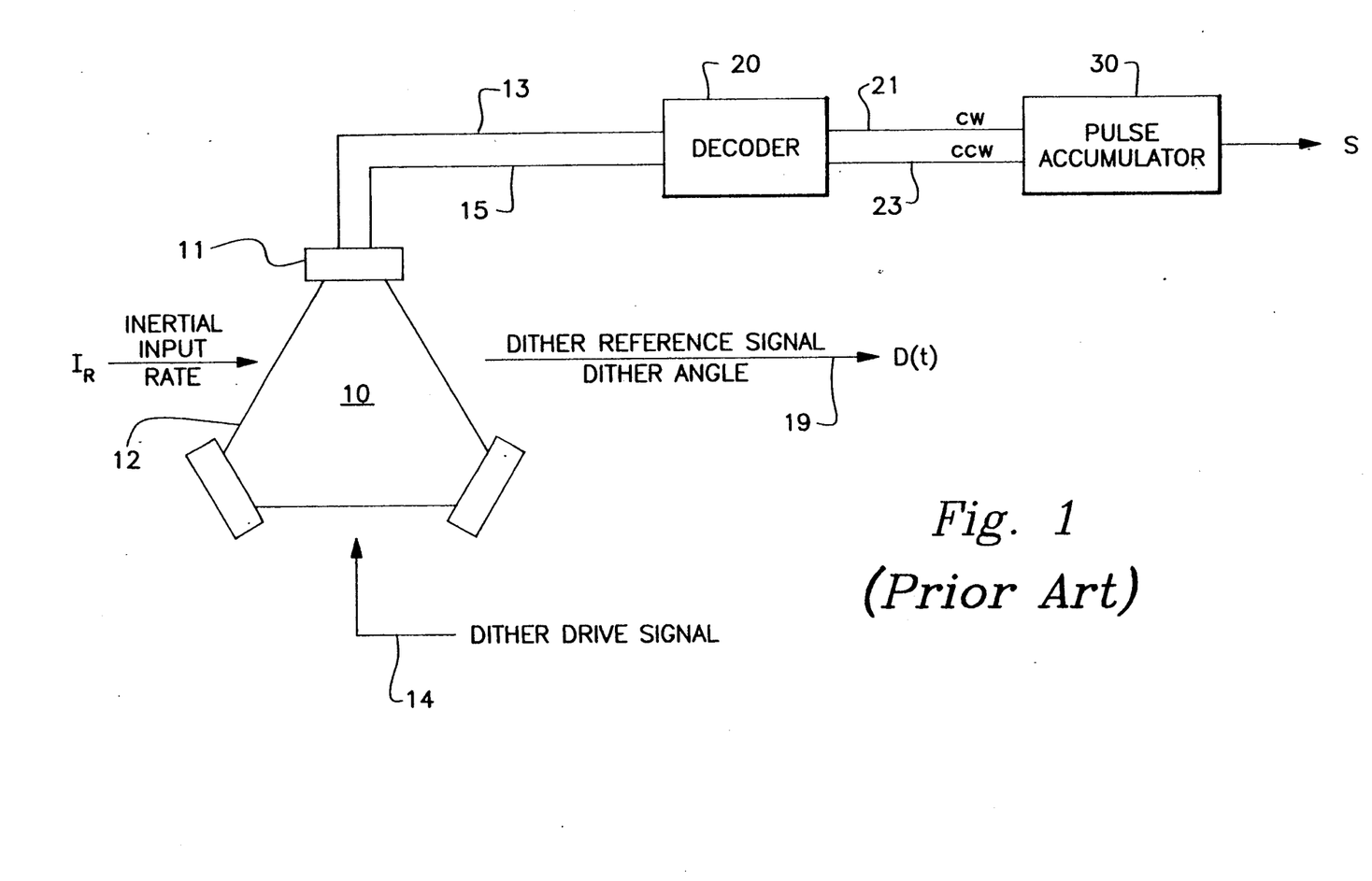
FIG. 1 is a schematic block diagram illustrating a ring laser gyro of the prior art.

Referring now to FIG. 1, there shown is a ring laser gyro like that shown in the aforementioned patents. Gyro 10 includes laser block 12 which provides the supporting structure for a propagation path for counter-propagating laser beams.

Sensor 10 includes a dither mechanization (not shown) responsive to a dither drive signal 14, generally sinusoidal, for providing the dither or alternating bias as previously described. For example, block 10 may be rotationally oscillated, as shown in the aforementioned patents. A dither spring (not shown) having piezoelectric devices attached thereto can operate in response to dither drive signal to cause the spring to flex and cause block 12 to rotationally oscillate relative to a mounting base (not shown), commonly referred to as the inertial platform. Furthermore, a piezoelectric device may also be attached to the spring for providing a dither reference signal, identified as signal "D(t)", on signal line 19, having signal characteristics directly related to the actual dither motion of the sensor.

The just mentioned piezoelectric output signal "D(t)" is sometimes referred to as the "dither pick-off signal". Signal D(t) may be either rotation angle or rate dependent upon the output circuitry which is driven by the piezoelectric pick-off, but herein is preferably indicative of sensor block rotation angle relative to the mounting base. The dither reference signal may be obtained by a variety of techniques depending upon the dither scheme that is selected (i.e. optical or mechanical).

U.S. Pat. No. 3,373,650, issued to Killpatrick describes a dither mechanization for rotational oscillations of the sensor block, a scheme commonly employed by most present day rotationally dithered ring laser gyros. An improved dither spring and drive mechanization is illustrated and described in U.S. Pat. No. 4,344,706, issued to Ljung et al. The latter patent also illustrates a mechanization for obtaining a dither reference signal representative of the sensor rotations caused by rotationally oscillating or dithering the sensor block. Further, U.S. Pat. No. 4,445,779, issued to Johnson, shows a dither drive signal and a means for obtaining a corresponding dither reference signal.

It should be noted that a diagram similar to FIG. 1 would be appropriate for describing an electro-optical alternating bias system using a Faraday cell, and the like.

A readout assembly 11 is mounted to laser block 12 and includes a means for combining a portion of the counter-propagating laser beams to provide an interference fringe pattern in a well known manner. Readout assembly 11 also includes a pair of photo detectors (not shown) for providing output signals on signal lines 13 and 15 which are out of phase with each other, generally in phase quadrature. These signals are processed by a signal decoder 20 which in turn provides pulses on either signal line 21 indicating a clockwise rotation, or pulses on signal line 23 indicating counterclockwise rotation of sensor 10. These latter mentioned pulses are accumulated in pulse accumulator 30 which provides an output signal S representative of the rotation angle of sensor 10.

Alternatively, decoder 20 may also be constructed to provide output pulses indicative of incremental rotation angle change and also a separate direction signal indicator. In turn a single counter may then be controlled up or down dependent upon the output of the direction indicator. These signals in turn may then be signal processed to provide gyro angular rate, and/or angular rotation information, either accumulated or incremental.

Herein, signal S is the digital representation of the rotation of sensor 10 directly derived from the sensor output, namely the gyro readout interference fringes. It should be understood that either mechanical or optical dithering of the counter propagating laser beams directly affects the number and rate of fringes which pass the readout photodetectors and so directly affects readout signal S. Therefore, if the sensor is dithered in any manner as already described, then signal S will include a dither signal component.

In the following exposition, the subscript "a" will be used to indicate an angle of rotation, and the subscript "r" will be used to indicate angular rate.

Figure 2:
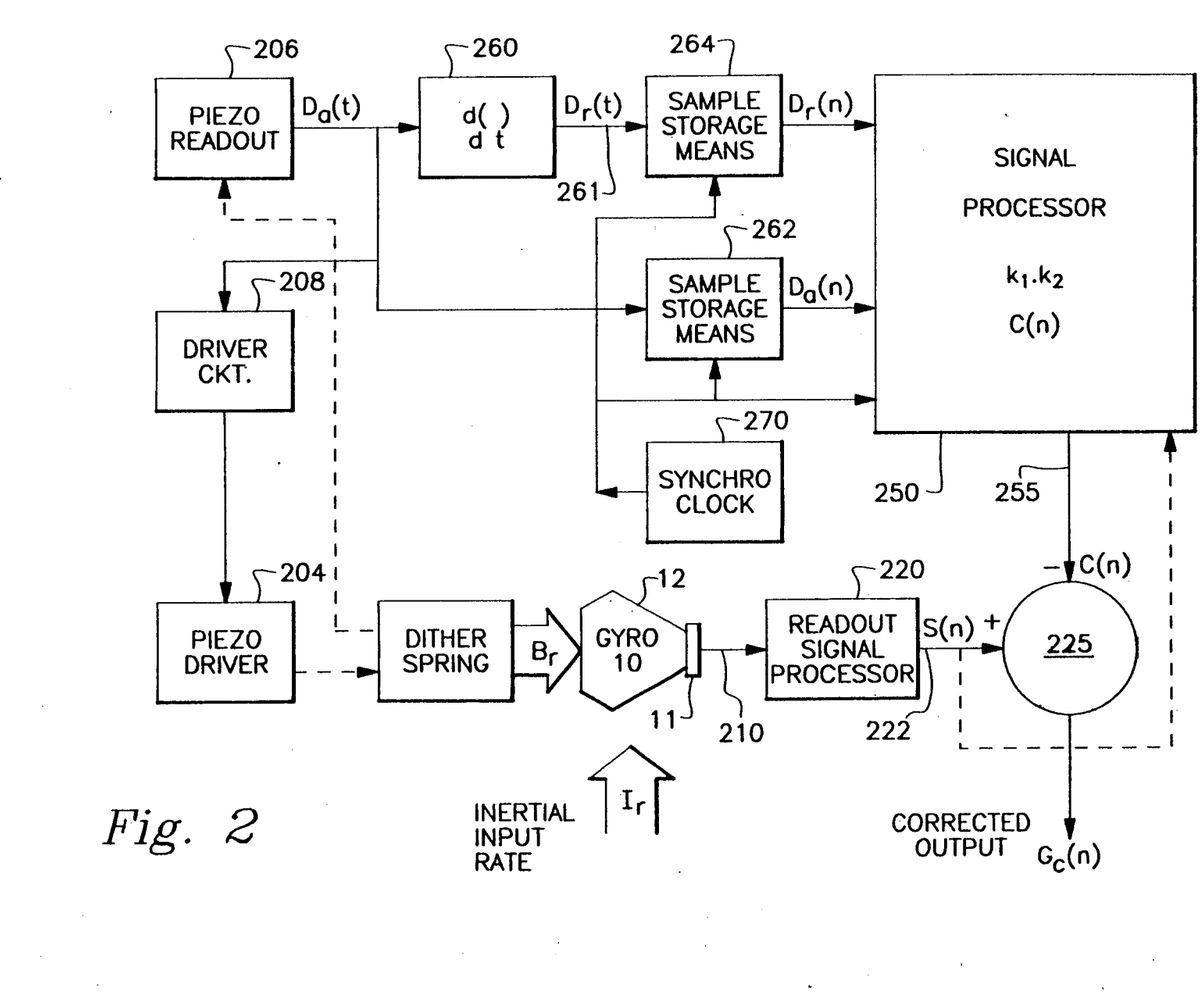
FIG. 2 is a schematic block diagram of the present invention for removing the dither signal component from the gyro readout signal.

The dither signal component stripper in accordance with the present invention is illustrated in the block diagram as illustrated in FIG. 2. FIG. 2 shows in further detail a dither drive system block diagram for rotationally oscillating the gyro block 12 as illustrated in FIG. 1. Specifically, a dither spring 202 imparts rotational motion to gyro block 12. The dither spring 202 is mechanically driven by a piezoelectric driver transducer 204. At the same time a piezoelectric readout transducer 206 provides an analog output signal $D_a(t)$ representative of an analog measurement of the angle of rotation of the gyro block 12 relative to the mounting base. In turn, the dither reference signal $D_a(t)$ is presented as a feedback input to driver circuit 208 which provides the control input to piezoelectric driver 204. The aforementioned system is intended to oscillate the gyro block 12 relative to the mounting base by a rotation rate identified as $B_r$, and at the same time the mounting base is rotated by the inertial input rate $I_r$ to be measured.

The gyro readout 11 will therefore produce an output signal from readout 11 on signal line 210 representative of the sum of $I_r$ and $B_r$, i.e., the rotation rate $G_r$ seen by gyro 10. In turn, gyro readout signal processor 220 will provide an output signal S(n) on signal line 222 representative of the angular rotation rate or angle of gyro 10 during the last sample period "n" as will be more fully described.

Signal line 222 is presented as one input to circuit means 225 for providing an output signal $G_c(n)$ representative of the signal S(n) less an incremental correction signal C(n) provided on signal line 255 by signal processor 250.

In accordance with the present invention, the dither reference signal $D_a(t)$, representative of the angle of dither rotation, is passed through a differentiation circuit means 260 for providing an analog output signal $D_r(t)$ on signal line 261 representative of the instantaneous rate of dither rotation as measured by the piezoelectric readout transducer 206. In turn, analog signals $D_a(t)$ and $D_r(t)$ are sampled and stored by sample storage means 262 and 264, respectively. Sample/storage means 262 provides a digital signal $D_a(n)$ representative of signal $D_a(t)$ at sample time "n" under control of synchronizing clock 270. Similarly, sample/storage means 264 provides a digital signal $D_r(n)$ representative of signal $D_r(t)$ at sample time "n" also under control of synchronizing clock 270. By way of example, sample/storage means 262 and 264 may be provided by simple analog or digital sample and hold circuits or the like to provide the intended function.

Signals $D_a(n)$ and $D_r(n)$ are presented to signal processor 250 for operating on at least the current values $D_a(n)$ and $D_r(n)$ to derive a correction signal C(n) in a manner as will now be described.

The gyro output rotation rate $G_r$ may be describes by:

$$G_r = I_r + B_r \tag{1}$$

where:
$G_r$ = gyro rotation rate output relative to the inertial frame,
$I_r$ = inertial rotation rate of mounting base relative to an inertial frame, and
$B_r$ = dither rotation rate of the gyro block relative to the mounting base.

Equation (1) can be rearranged and rewritten in terms of rotation angles as:

$$I_a = G_a - B_a \tag{2}$$

where the subscript "r" indicates rate, and the subscript "a" indicates angle as aforesaid. The true dither rotation angle of the block $B_a$ may be expressed as a function of the measured dither angle obtained from the piezoelectric readout:

$$B_a(t) = k_1 * D_a(t) + k_2 * D_r(t) \tag{3}$$

where $K_1$ and $K_2$ reflect the characteristics of the the means or measuring technique of to produce the dither reference signal. For example, $K_1$ and $K_2$ may reflect the piezoelectric element characteristics for a PZT dither pick off of a rotationally dithered gyro.

Assuming that constants $k_1$ and $k_2$ are known, and using equations (2) and (3), the corrected gyro output can be expressed as:

$$G_c(n) = S(n) - k_1[(D_a(n) - D_a(n-1)] - k_2[(D_r(n) - D_r(n-1)] \tag{4}$$

where, $S(n)$ = incremental gyro rotation change derived from the gyro readout output change over the $n^{th}$ computational interval, $G_c(n)$ = incremental gyro output stripped of the dither component over the $n^{th}$ computational interval, $D_a(n)$ = is the dither angle of the block relative to the mounting base at the $n^{th}$ computational interval, $D_r(n)$ = is the dither angular rate of the block relative to the mounting base at the $n^{th}$ computational interval, and $k_1, k_2$ = coefficients representative of the characteristics of the dither reference signal measurement technique.

The coefficients may be either chosen or may be determined by calibration using raw data. For example, the determination or calibration of the values $k_1$ and $k_2$ may be obtained by the application of the least-squares criterion or other algorithm based on the observed measurements of $G_c(n)$, $S(n)$, $D_a(n)$, and $D_r(n)$. An example of the least-squares criterion to obtain $k_1$ and $k_2$ may be mathematically described as follows:

$$\begin{bmatrix} \sum_i \Delta \alpha_i^2 & \sum_i \Delta \alpha_i \Delta a_i \\ \sum_i \Delta \alpha_i \Delta a_i & \sum_i \Delta a^2 \end{bmatrix} \begin{bmatrix} k_1 \\ k_2 \end{bmatrix} = \begin{bmatrix} \sum_i [\Delta \theta_i - \Delta \theta_d(i)] \Delta \alpha_i \\ \sum_i [\Delta \theta_i - \Delta \theta_d(i)] \Delta a_i \end{bmatrix} \tag{5}$$

Where

"i" is the $i^{th}$ gyro of an inertial measurement unit (two or more gyros), $\Delta \alpha_i = D_a(n) - D_a(n-1)$, and $\Delta a_i = D_r(n) - D_r(n-1)$, $\Delta \theta_i = S(n) - S(n-1)$, and $\Delta \theta_d$ = dither induced motion of the inertial platform.

Dither induced motion of the inertial platform may be derived from the vector equation:

$$\Delta \theta_d = [J][\Delta \alpha]$$

For three gyros, matrix [J] is a 3×3 constant matrix which describes the total system inertial distribution of mass, sometime referred to as the moment of inertial matrix, and $[\Delta \alpha]$ is vector consisting of a 3×1 matrix describing the dither angle charge of the three gyros.

The calibration operation can be multiplexed between three system gyros of an inertial measurement unit, given that the values of $k_1$ and $k_2$ vary slowly, as expected to be the case. A calibration time of a second or less should be adequate to calibrate a single gyro. When dither induced base motion is negligible, due to a very large ratio of mounting base inertia to gyro inertia, the term $\Delta \theta_d$ in (4) may be eliminated.

The piezo calibration coefficients $k_1$ and $k_2$ may be determined in background or foreground. When done in foreground one can take advantage of the fact that the elements of the matrix on the left side of (4) vary slowly, and are a function only of the dither amplitude and frequency. Therefore, these summations need not be carried out over the same time interval as the two summations on the right side of (4). This allows increased efficiency in carrying out (4), in that two or possibly three stages may be defined for performing the complete set of computations required for the calibration of a single gyro. It is important only that the two summations on the right side of (4) be carried out concurrently, using the same sensor data for both summations.

Figure 3:
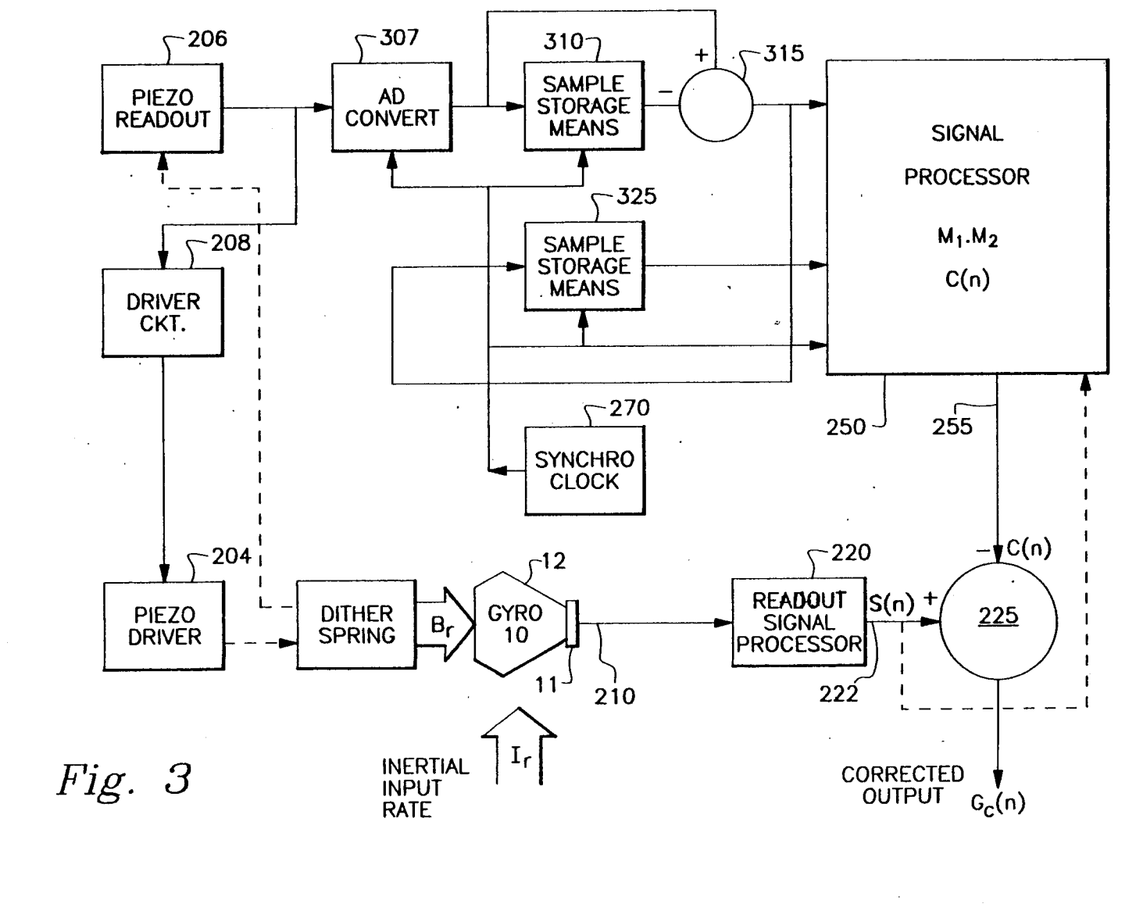
FIG. 3 is a schematic block diagram of another embodiment of the present invention.

FIG. 3 illustrates another embodiment of the invention, similar to that illustrated in FIG. 2. In FIG. 3, the output of piezoelectric readout transducer 206 is first presented to an analog-to-digital converter 307. In turn, the output of the A/D converter 307 is presented as an input to sample/storage means 310 and one input of circuit means 315, the other input thereof being the output of sample/storage means 310. In turn, the output of circuit means 315 is presented to a second sample/storage means 325. The output of circuit means 315 and sample and storage means 325 are presented to signal processor 350.

Similar to FIG. 2, synchronizing clock means 270 provides a clock signal to converter 307, sample/storage means 310 and 325, and also to signal processor 350. Therefore, the output of circuit means 315 is representative of the change in the measured dither angle during one clock period:

$$\Delta \alpha_n = D_a(n) - D_a(n-1) \tag{6}$$

The output of sample/storage means 325 is therefore the resultant $\Delta \alpha_n$ at the previous clock cycle, namely $\Delta \alpha_{n-1}$.

The embodiment of the invention illustrated in FIG. 3 employs an approximation for the value of the dither rate. It avoids the necessity of an integrator or differentiator as illustrated in FIG. 2. In FIG. 3, the dither signal component stripper utilizes a digitally derived $\Delta \alpha$. For purely sinusoidal dither, $\Delta \alpha$ is given without approximation by a weighted sum of the form $$\Delta \bar{a}_n = a \Delta \alpha_n + b \Delta \alpha_{n-1} \tag{7}$$

where a and b are constants defined by the frequency $\Omega$ of a sinusoidal dither drive signal, and the duration $\Delta T$ of the computational interval, in the following manner:

$$a = \Omega \left[ \frac{\cos\Omega\Delta T}{\sin\Omega\Delta T} \right] b = \left[ \frac{\Omega}{\sin\Omega\Delta T} \right]$$

From the definitions of a and b, the relationship defined by (7) will be valid as long as $\Omega\Delta T$ is not a multiple of $\pi$. That is, the sampling frequency $1/\Delta T$ must be greater than twice the frequency $\Omega$ of the sinusoidal signal.

Given that the form given by (7) defines the term $\Delta\alpha_n$ in the dither stripping equation defined by (4) the following alternate form of equation (4) may derived using equation (7):

$$\begin{aligned}
\Delta\hat{\theta}_n &= \Delta\theta_n - \kappa_1\Delta\alpha_n - \kappa_2\Delta\alpha_n \\
&= \Delta\theta_n - \kappa_1\Delta\alpha_n - \kappa_2(a\Delta\alpha_n + b\Delta\alpha_{n-1}) \\
&= \Delta\theta_n - M_1\Delta\alpha_n - M_2\Delta\alpha_{n-1}
\end{aligned} \quad (8)$$

where $$M_1 = \kappa_1 + \kappa_2 a$$
$$M_2 = \kappa_2 b$$

The implementation of the dither stripper utilizing a digitally derived $\Delta\hat{\alpha}_n$ is as shown in FIG. 3. The dither component is removed by applying the correction defined by (8). The piezo coefficients $M_1$ and $M_2$ may be determined by the least-squares-fit calibration procedure defined by:

$$\begin{bmatrix} \sum_i \Delta\alpha_i^2 & \sum_i \Delta\alpha_i\Delta\alpha_{i-1} \\ \sum_i \Delta\alpha_i\Delta\alpha_{i-1} & \sum_i \Delta\alpha_{i-1}^2 \end{bmatrix} \begin{bmatrix} c_1 \\ c_2 \end{bmatrix} = \begin{bmatrix} \sum_i [\Delta\theta_i - \Delta\theta_d(i)]\Delta\alpha_i \\ \sum_i [\Delta\theta_i - \Delta\theta_d(i)]\Delta\alpha_{i-1} \end{bmatrix} \quad (9)$$

As noted earlier, when the dither-induced base motion is very small, due to a very small gyro to mounting base inertia, the term $\Delta\theta_d$ in the piezo least-squares calibration procedure may be safely ignored.

The piezo calibration equation defined by (8) lends itself to either a background or foreground approach. If done in background, a set of $\Delta\theta$'s and $\Delta\alpha$'s are collected at the gyro data input rate and stored over a period of time of approximately a second or less; then, in background, the summations defined are carried out using the stored data, and the coefficients $M_1$ and $M_2$ computed by inverting (9). When done in foreground, the summations $\Sigma\Delta\alpha_i^2$ and $\Sigma\Delta\alpha_i\Delta\alpha_{i-1}$ are done in real time at the gyro data input frequency over a period of time of a second or less. Then, the summations $\Sigma\Delta\theta_i\Delta\alpha_i$ and $\Sigma\Delta\theta_i\Delta\alpha_{i-1}$ are done over a subsequent time interval equal to that used in carrying out the first set of summations. Finally, the piezo coefficients are found by first setting $\Sigma\Delta\alpha_{i-1}^2 = \Sigma\Delta\alpha_i^2$ in (9), and then inverting to obtain $M_1$ and $M_2$. Both the background and foreground piezo calibration approaches are intended to be applied to a single gyro at a time.

In the event that the time delay in the piezo and its readout electronics is known to be negligible, the dither stripping equation defined by (6) reduces to:

$$\Delta\hat{\theta}_n = \Delta\theta_n M \Delta\alpha_n$$

and the piezo calibration coefficient M is determined by the simplified least-squares-fit equation:

$$M = \sum_i [\Delta\theta_i - \Delta\theta_d(i)]\Delta\alpha_i / \sum_i \Delta\alpha_i^2$$

The dither induced term $\Delta\theta_d(i)$ in the solution for the piezoelectric characteristic constants illustrated in equation (4) or equation (8) is particularly important when more than one rotationally oscillated or dithered gyro is mounted to a common mounting base. This is so since the oscillating motions of one gyro will cross over as an input to another gyro. The term $\Delta\theta_d(i)$ takes into consideration the coupled motion from any other dithered gyro as an effect on the $i^{th}$ gyro. The term $\Delta\theta_d(i)$ may be expressed as a function of the moment of inertia system matrix "J" and the incremental changes in the dither angle output.

Thus, the piezoelectric characteristic coefficients may be calibrated to include the effects of the other system gyros of the inertial measurement unit.

The implementation of the dither stripper technique in accordance with the present invention is highly cost effective in terms of hardware and required computer throughput. Only two multiplies and two adds are required per gyro over each gyro input data interval, with a simple set of computations in background or foreground serving to calibrate the gyro readout piezo gains. A foreground piezo calibration approach is probably the preferred approach since no computer memory need be allocated to store the sensor data—as is true when the piezo calibration is carried out in background. The scheme also lends itself simply and naturally to providing for dither-induced base motion and also provides, in addition to its inherent simplicity, a high degree of flexibility to accommodate a wide range of values for the ratio of gyro data input frequency to dither frequency, as well as easily accounting for finite time delays in the piezo and its electronics.

It should be recognized by those skilled in the art that many of the blocks of the diagrams shown in either FIG. 2 or FIG. 3 may be combined in signal processor 250 or 350, respectively. Signal processors 250 and 350 may be of any variety in order to carry out the mathematical computations in accordance with the present invention as should be understood by those skilled in the art.

Thus, it should be recognized by those skilled in the art the present invention may be practice by circuitry and algorithms beyond that disclosed herein without departing from the true spirit and scope of the present invention. Specifically, there are a wide variety of mathematical algorithms for calculating the piezoelectric coefficients other than the least-squares-fit algorithm shown herein. Further, there are a wide variety of circuit configurations for obtaining the necessary data derived from the piezoelectric readout transducer beyond that illustrated in the accompanying drawings.

The embodiments of an invention in which an exclusive property or right is claimed are defined as follows:

1. A dithered angular rate sensor comprising:
   support means for supporting a pair of counter-propagating waves along a closed-loop path, each of said waves having a frequency related to the rotation of said sensor;

means for rotationally oscillating said support means relative to a mounting base in order to dither the frequency of said pair of waves;

means for producing a dither reference signal measurement related to said dithering of said support means;

means responsive to said dither reference signal for deriving information representative of the dither angle $D_a$ nd dither angular rate $D_r$ of said support means relative to said mounting base;

signal processing means for operating on said dither angle and dither angular rate information for providing a correction signal substantially in accordance with the function:

$$C = k_1 {}^* D_a + k_2 {}^* D_r$$

where $k_1, k_2$ are constants representative of the characteristics of the dither reference signal means;

readout means responsive to said waves for producing a readout signal indicative of rotation of said sensor relative to an inertial reference frame, said readout signal including a dither signal component due to said dithering of said support means relative to said mounting base;

means for subtracting said dither correction from said readout signal to provide a corrected gyro output signal devoid substantially of any dither signal component.

2. The sensor of claim 1 further comprising:

means for deriving from said dither reference signal a first incremental value representative of the change in said dither angle during a first clock signal sample period;

means for deriving from said dither reference signal a second incremental value representative of the change in said dither angular rate during said first clock signal sample period; and wherein $D_a$ is said first incremental value, and $D_r$ is said second incremental value.

3. A dithered angular rate sensor comprising:

support means for supporting a pair of counter-propagating waves along a closed-loop path, each of said waves having a frequency related to the rotation of said sensor;

means for rotationally dithering said support means relative to a mounting base in order to dither the frequency of said pair of waves;

means for producing a dither reference signal measurement related to said dithering of said support means;

means responsive to said dither reference signal for deriving information representative of the dither angle and dither angular rate of said support means relative to said mounting base;

readout means responsive to said waves for producing a readout signal indicative of rotation of said sensor, said readout signal including a dither signal component due to said dithering;

signal processing means for operating on said dither angle and dither angular rate information for providing a correction signal as substantially in accordance with the function:

$$C(n) = k_1[D_a(n) - D_a(n-1)] + k_2[(D_r(n) - D_r(n-1)]$$

where, $D_a(n)$, $D_a(n-1)$ is representative of the dither angle of the block relative to the mounting base at the $n^{th}$, and $(n-1)$ clock cycle, respectively, $D_r(n)$, $D_r(n-1)$ is representative of the dither angular rate of the block relative to the mounting base at the $n^{th}$, and $(n-1)$ clock cycle, respectively, and;

$k_1, k_2$ = constants representative of the characteristics of the dither reference signal means;

$C(n)$ is representative of the incremental error in said gyro output signal;

means for combining said dither correction signal and said readout signal to provide a corrected gyro output signal devoid substantially of any dither signal component, and substantially described by:

$$G_c(n) = S(n) - C(n)$$

where, $S(n)$ = is the incremental gyro rotation change derived from said gyro readout means output signal change over the $n^{th}$ clock cycle time interval, $G_c(n)$ = is the gyro output change over the $n^{th}$ clock cycle time interval stripped of said dither component after the $n^{th}$ clock cycle.

4. The sensor of claim 3 further comprising:

means for time differentiating said dither reference signal and providing an output signal representative thereof; and means for sampling and storing values of said dither reference signal representative of said dither angle, and sampling and storing values of the output signal of said differentiating means representative of said dither angular rate occurring at the instant of said clock signal, and thereby provide said values of $D_a(n)$ and $D_r(n)$, respectively, where "n" is the instant clock cycle sample time.

5. A dithered angular rate sensor comprising:

supporting a pair of counter-propagating waves along a closed-loop path, each of said waves having a frequency related to the rotation of said sensor;

means for rotationally dithering said support means relative to a mounting base in order to dither the frequency of said pair of waves;

means for producing a dither reference signal measurement related to said dithering of said support means;

analog to digital conversion means responsive to said dither reference signal for providing a first digital signal representative of said dither reference signal;

means for sampling said first digital signal in accordance with a clock signal;

means for determining an incremental sample change in said first digital signal sample during an $n^{th}$ interval of said clock signal;

readout means responsive to said waves for producing a readout signal indicative of rotation of said sensor, said readout signal including a dither signal component due to said dithering;

signal processing means responsive to said incremental changes in said incremental sample change and at least one past value of said incremental sample change for determining said correction signal as mathematically expressed by:

$$C(n) = M_1 \Delta a_n - M_2 \Delta a_{n-1}$$

where $\Delta\alpha_n$ is said incremental sample change of said first digital signal during said $n^{th}$ interval, and $\Delta\alpha_{n-1}$ is said incremental change of said first digital signal during the $(n-1)^{th}$ interval;

$M_1, M_2$ = constants representative of the characteristics of the dither reference signal means;

means for combining said dither correction and said readout signal to provide a corrected gyro output signal devoid substantially of any dither signal component.

6. The sensor of claim 1 further comprising means responsive to said gyro readout output signal and corresponding values of $D_a$ and $D_r$ occurring at a plurality of samples times for empirically determine said coefficients $K_1$ and $K_2$.

7. The sensor of claim 6 wherein said coefficients take into account dither induced motion from one sensor into another sensor mounted on the same inertial platform.

* * * * *

UNITED STATES PATENT AND TRADEMARK OFFICE
CERTIFICATE OF CORRECTION

PATENT NO. : 5,048,963
DATED : September 17, 1991
INVENTOR(S) : Mario B. Ignagni It is certified that error appears in the above-identified patent and that said Letters Patent is hereby corrected as shown below:

Column 9, Line 9, delete "nd" and insert --and--.

Column 10, Line 39, before "supporting" insert

--support means for--.

Signed and Sealed this

Nineteenth Day of January, 1993

Attest:

DOUGLAS B. COMER

*Attesting Officer*  Acting Commissioner of Patents and Trademarks